G. M. BRANCH.
Horse-Powers.
No. 136,899.  Patented March 18, 1873.
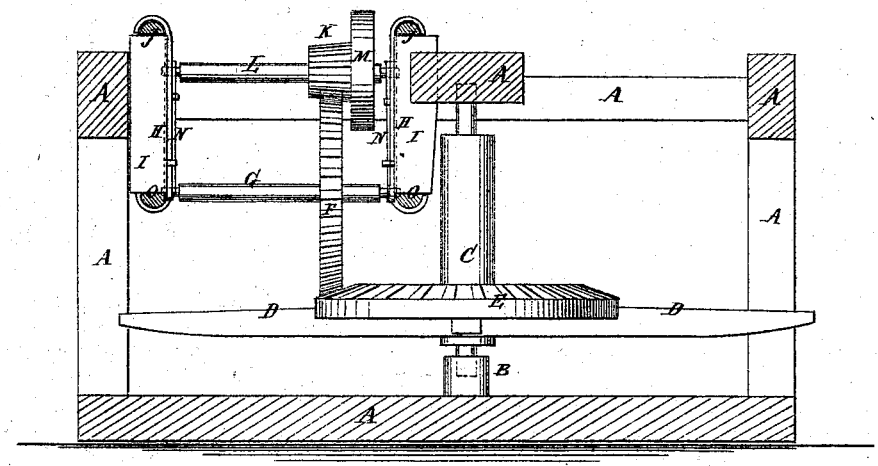
Witnesses:  
N. W. Almqvist  
C. Sedgwick  
Inventor:  
G. M. Branch  
per ——— Attorneys.

UNITED STATES PATENT OFFICE.

GEORGE M. BRANCH, OF WINONA, ASSIGNOR TO W. A. MOORE, OF MAGNOLIA, MISSISSIPPI.

IMPROVEMENT IN HORSE-POWERS.

Specification forming part of Letters Patent No. 136,899, dated March 18, 1873.

*To all whom it may concern:*

Be it known that I, GEORGE MARION BRANCH, of Winona, in the county of Choctaw and State of Mississippi, have invented a new and useful Improvement in Horse-Power, of which the following is a specification:

The figure is a detail vertical section of my improved machine illustrating its construction.

My invention has for its object to furnish an improved horse-power for driving cotton-gins and other light machinery; and it consists in the construction and combination of certain parts of the machine, as hereinafter more fully described.

In the accompanying drawing, A is the frame of the machine, to the middle part of the base of which is attached a step, B, in which a pivot formed upon or attached to the lower end of the vertical shaft C revolves. The upper end of the shaft C is pivoted to the upper part of the frame A. To the lower part of the vertical shaft C is attached the middle part of the sweep D, to the end or ends of which the power is applied. To the shaft C and sweep D is securely attached a large horizontal wheel, E, upon the upper side of the rim of which are formed bevel-gear teeth, into which mesh the teeth of the large vertical gear-wheel F. The gear-wheel F is attached to a horizontal shaft, G, the journals of which revolve in bearings H that slide up and down in grooves in the inner sides of the upright bars I, attached to the upper part of the frame A. The upper ends of the bearings H overlap the upper ends of the bars I, where they are secured by wedges J, so that by adjusting the said wedges J the said bearings may be adjusted as required. The teeth of the gear-wheel F also mesh into the teeth of the small gear-wheel K, attached to the shaft L, to which shaft is also attached the band-wheel M, from which the power is taken to the machinery to be driven. The journals of the shaft L revolve in bearings N, which slide up and down in grooves in the inner sides of the bars I, and their lower ends overlap the lower ends of the bars I, and are secured in place by wedges O driven between them and the lower ends of the said bars I, so that by adjusting the said wedges the bearings N may be adjusted as required.

By this construction, the power being applied to the large wheel E is applied at great advantage, so that more work may be done with a less expenditure of power than with machines constructed in the ordinary manner.

Having thus described my invention, I claim as new and desire to secure by Letters Patent—

The combination of the bearings H N and wedges J O with the shafts G L, gear-wheels E F K, and bars I, substantially in the manner herein shown and described, and for the purpose set forth.

GEORGE MARION BRANCH.

Witnesses:
 H. R. McINNIS,
 F. H. STEELE.